US007264904B2

United States Patent
Coffey et al.

(10) Patent No.: US 7,264,904 B2
(45) Date of Patent: *Sep. 4, 2007

(54) CYLINDRICAL BATTERY CELL HAVING IMPROVED POWER CHARACTERISTICS AND METHODS OF MANUFACTURING SAME

(75) Inventors: Brendan Coffey, Austin, TX (US); Charles Edward Sesock, College Station, TX (US); Ramesh C. Kainthla, College Station, TX (US); David John Manko, Bryan, TX (US); Quincy Glenn Holloter, Conroe, TX (US)

(73) Assignee: Rechargeable Battery Corporation, College Station, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/846,020

(22) Filed: May 14, 2004

(65) Prior Publication Data

US 2005/0048364 A1   Mar. 3, 2005

Related U.S. Application Data

(60) Provisional application No. 60/513,167, filed on Oct. 21, 2003, provisional application No. 60/503,298, filed on Sep. 16, 2003, provisional application No. 60/499,545, filed on Sep. 2, 2003.

(51) Int. Cl.
*H01M 2/02*    (2006.01)
*H01M 2/18*    (2006.01)
*H01M 4/00*    (2006.01)
*H01M 4/42*    (2006.01)
*H01M 4/50*    (2006.01)

(52) U.S. Cl. ............... 429/164; 429/131; 429/165; 429/224; 429/229; 29/623.1

(58) Field of Classification Search .......... 429/94, 429/131, 136, 137, 163, 164, 165, 206, 209, 429/224, 229; 29/623.1
See application file for complete search history.

(56) References Cited

U.S. PATENT DOCUMENTS 4,011,103 A    3/1977   Kordesch (Continued)

FOREIGN PATENT DOCUMENTS

WO    WO 01/48836    *   7/2001

*Primary Examiner*—Jonathan Crepeau
(74) *Attorney, Agent, or Firm*—Factor & Lake, Ltd.

(57) ABSTRACT

A battery cell, such as a cylindrical alkaline cell, is disclosed having significantly improved capacity utilization at high discharge rates while maintaining much of the energy content and other feature advantages of typical cylindrical alkaline cells, by implementing a novel cell construction that produces increased surface area between the anode and cathode. One particular characterization of the cell construction of the present invention comprises an electrochemical battery cell comprising a cell housing defining an interior space having an interior surface, a first terminal and a second terminal. The cell further comprises an inner electrode encapsulated by a separator and disposed within the interior space of the housing. The inner electrode has a thin cross section in a folded configuration and is formed such that an outer extent of the inner electrode is generally conforming to a contour defined by the interior surface of the cell housing. The inner electrode is in electrical communication with the second terminal of the housing. An outer electrode is disposed within the interior space of the housing such that it is in ionic communication with the inner electrode and in electrical communication with the first terminal of the cell housing.

42 Claims, 7 Drawing Sheets

U.S. PATENT DOCUMENTS

| | | |
|---|---|---|
| 4,029,855 A | 6/1977 | Dougherty et al. |
| 4,215,186 A | 7/1980 | Jaeger |
| 4,292,357 A | 9/1981 | Erisman et al. |
| 4,327,163 A | 4/1982 | Wheadon |
| 4,396,691 A | 8/1983 | Wheadon |
| 4,663,253 A | 5/1987 | Simonton et al. |
| 4,668,320 A | 5/1987 | Crabtree |
| 4,680,242 A | 7/1987 | Simonton et al. |
| 4,761,352 A * | 8/1988 | Bakos et al. .................. 429/94 |
| 4,788,113 A | 11/1988 | Böhle et al. |
| 4,957,826 A | 9/1990 | Cheiky |
| 5,004,655 A | 4/1991 | Symanski |
| 5,075,183 A | 12/1991 | Yamaguchi et al. |
| 5,147,737 A | 9/1992 | Post et al. |
| 5,209,993 A | 5/1993 | Mix |
| 5,230,968 A | 7/1993 | Bones et al. |
| 5,384,211 A | 1/1995 | Choi et al. |
| 5,439,760 A * | 8/1995 | Howard et al. ................ 429/94 |
| 5,470,676 A | 11/1995 | Nakano |
| 5,523,183 A | 6/1996 | Koehler et al. |
| 5,558,952 A | 9/1996 | Knauer |
| 5,563,007 A | 10/1996 | Young et al. |
| 5,569,551 A | 10/1996 | Pedicini et al. |
| 5,580,676 A | 12/1996 | Honda et al. |
| 5,616,434 A | 4/1997 | Redden et al. |
| 5,626,989 A | 5/1997 | Doundoulakis |
| 5,635,312 A | 6/1997 | Yanagisawa et al. |
| 5,677,080 A * | 10/1997 | Chen .......................... 429/167 |
| 5,716,734 A | 2/1998 | Nakano |
| 5,824,434 A | 10/1998 | Kawakami et al. |
| 5,935,724 A | 8/1999 | Spillman et al. |
| 5,948,561 A | 9/1999 | Urry |
| 5,958,088 A | 9/1999 | Vu et al. |
| 6,001,503 A | 12/1999 | Hercamp et al. |
| 6,037,077 A | 3/2000 | Nowaczyk |
| 6,074,781 A | 6/2000 | Jurca |
| 6,153,335 A | 11/2000 | Vutetakis et al. |
| 6,207,322 B1 | 3/2001 | Kelsey et al. |
| 6,258,473 B1 | 7/2001 | Spillman et al. |
| 6,261,717 B1 | 7/2001 | Luo et al. |
| 6,326,102 B1 | 12/2001 | Getz |
| 6,410,187 B1 | 6/2002 | Luo et al. |
| 6,451,486 B1 | 9/2002 | Davis et al. |
| 6,472,099 B1 | 10/2002 | Lee et al. |
| 6,482,543 B1 | 11/2002 | Shelekhin |
| 6,492,059 B1 | 12/2002 | Hottori et al. |
| 6,514,637 B2 | 2/2003 | Treger et al. |
| 6,521,378 B2 | 2/2003 | Durkot et al. |
| 6,541,140 B1 | 4/2003 | Spillman et al. |
| 6,630,262 B2 | 10/2003 | Yang et al. |
| 2001/0038943 A1 | 11/2001 | Spillman et al. |
| 2001/0041276 A1 | 11/2001 | Yang et al. |
| 2002/0106557 A1 | 8/2002 | Fraser-Bell et al. |
| 2002/0132150 A1 | 9/2002 | Yang et al. |
| 2002/0160263 A1 | 10/2002 | Corrigan et al. |
| 2003/0162089 A1 | 8/2003 | Dreyer et al. |
| 2003/0186117 A1 | 10/2003 | Shokoohi et al. |
| 2004/0058234 A1 | 3/2004 | Slezak |

\* cited by examiner

CYLINDRICAL BATTERY CELL HAVING IMPROVED POWER CHARACTERISTICS AND METHODS OF MANUFACTURING SAME

CROSS-REFERENCE TO RELATED APPLICATIONS

This application claims priority to Provisional Application Ser. No. 60/499,545, filed on Sep. 2, 2003; Provisional Application Ser. No. 60/503,298, filed Sep. 16, 2003; and Provisional Application Ser. No. 60/513,167, filed Oct. 21, 2003, all of which are incorporated herein by reference.

TECHNICAL FIELD

The present invention generally relates to electrochemical battery cells. More particularly, the invention relates to electrochemical battery cells, such as alkaline cells, having improved power and energy delivery capability through increased surface area interface between electrode components.

BACKGROUND OF THE INVENTION

Alkaline batteries based on manganese dioxide cathodes and zinc anodes are widely used for consumer portable electronic applications. There is a large market for primary alkaline cells in standard cylindrical formats such as AAA, AA, C and D sizes. These products have numerous advantages. Zinc and manganese dioxide are inexpensive, safe and environmentally benign and the system provides good energy density. For the consumer, these standard alkaline products have long offered a simple and convenient universal solution for an array of electronic products.

There has been a proliferation in recent years, however, of new portable electronic devices including personal digital assistants, MP3 recorders and players, DVD players, digital cameras, or the like. There is also a trend toward smaller and lighter portable electronic devices that limit the onboard battery size. Compared to earlier devices, such as, for example, transistor radios, the power consumption for many of these new devices can require higher continuous or pulse currents. Conventional or even premium alkaline cell designs cannot efficiently deliver their stored energy at the higher drain rates.

Figure 1:
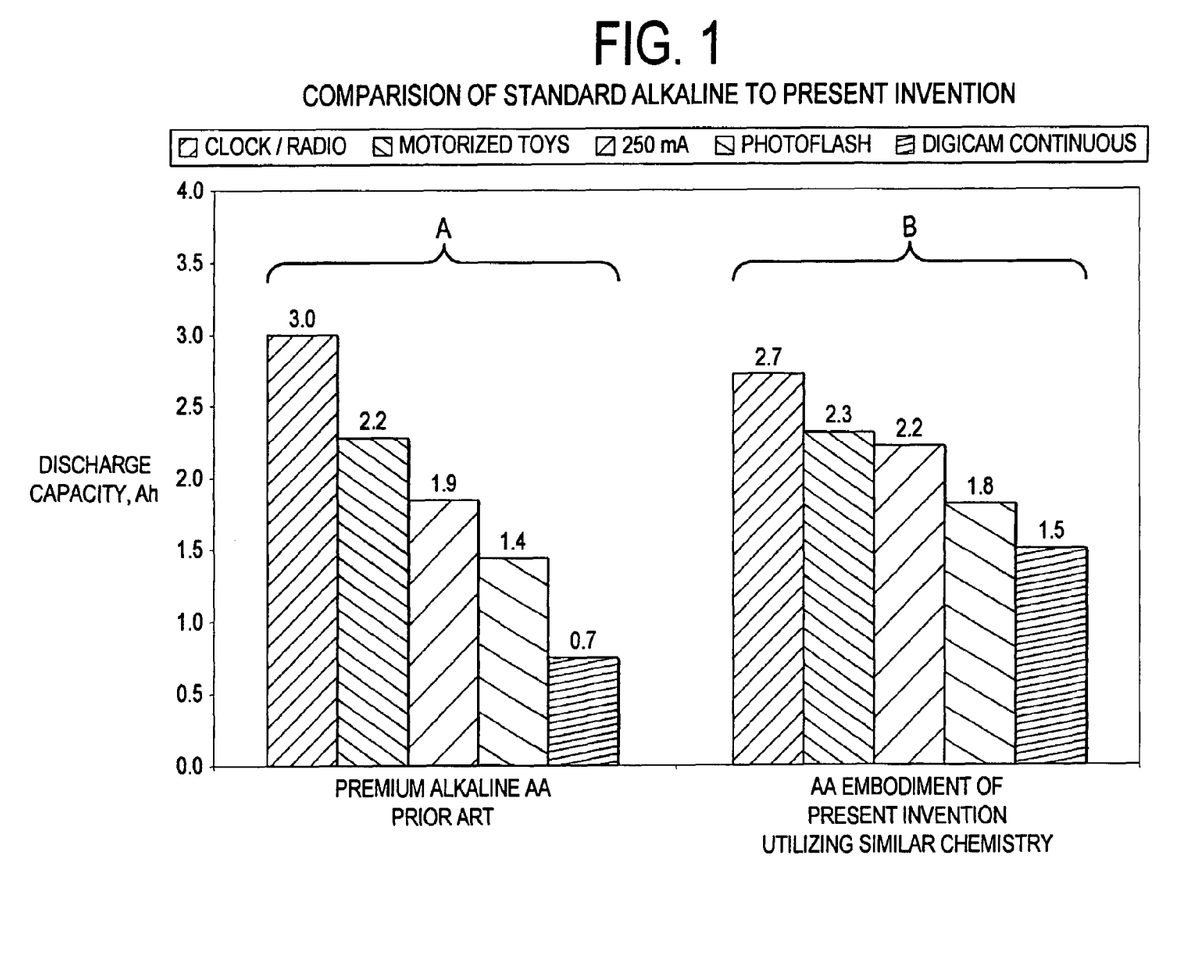
FIG. 1 is a graph depicting the approximate discharge capacity in Ah for various ANSI type tests for a current commercial premium AA cell (prior art) and a AA cell embodiment in accordance with the present invention.

FIG. 1 (section A) shows the capacity that can be delivered by a premium commercial alkaline AA cell under five discharge conditions intended to simulate various consumer electronics application loads (based on American National Standards Institute tests, Reference ANSI C18.1M, Part1-2001). At low drain rates (radio/43 ohm discharge) the alkaline AA "bobbin" cell delivers nearly all of its theoretical capacity (about 3 Ah); at intermediate loads (electronic game/250 mA discharge, motorized toy/3.9 ohm discharge) about two-thirds of theoretical; and at moderately high to high drain rates (photoflash/1 Amp pulse, digital camera/1 Amp continuous discharge), only ¼ to ½ of theoretical capacity can be accessed.

These inefficiencies under high rate discharge are related to internal resistance and electrochemical limitations of the conventional alkaline bobbin-cell construction. While much effort has gone into improving the energy content of the conventional alkaline bobbin cell by optimizing the internal packing and ionic conductivity of the electrodes, the fundamental design itself has changed little.

Figure 2:
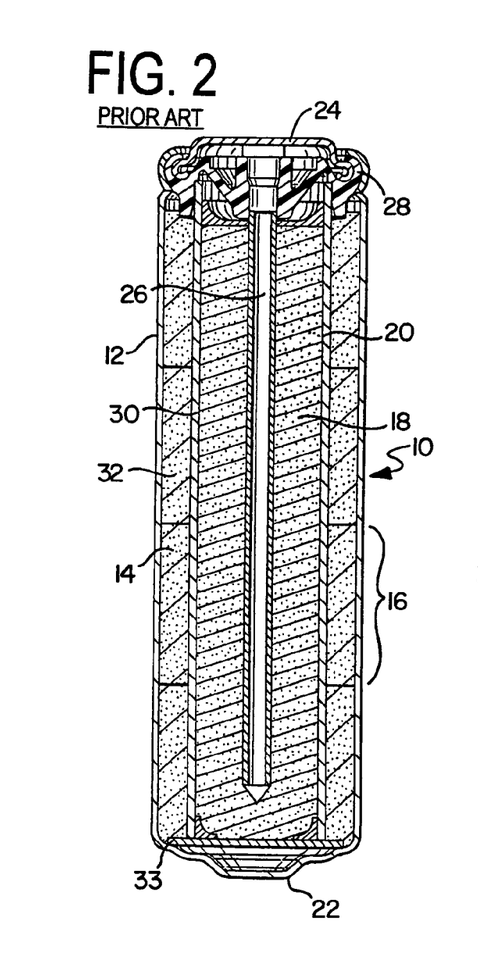
FIG. 2 is a cross-sectional elevational view of a typical cylindrical cell having a bobbin-type construction.

As shown in FIG. 2, a typical alkaline manganese dioxide-zinc bobbin cell 10 comprises the following main units: a steel can 12, optionally coated with a conductive coating on the inside of the can, defining a cylindrical inner space, a manganese dioxide cathode 14 formed by a plurality of hollow cylindrical pellets 16 pressed in the can, a zinc anode 18 made of an anode gel and arranged in the hollow interior of the cathode 14, and a cylindrical separator 20 separating the anode 18 from the cathode 14. The ionic conductivity between the anode and the cathode is provided by the presence of potassium hydroxide, KOH, electrolyte added into the cell in a predetermined quantity.

The can 12 is closed at the bottom, and it has a central circular pip 22 serving as the positive terminal. The upper end of the can 12 is hermetically sealed by a cell closure assembly which comprises a negative cap 24 formed by a thin metal sheet, a current collector nail 26 attached to the negative cap 24 and penetrating deeply into the anode gel to provide electrical contact with the anode, and a plastic top 28 electrically insulating the negative cap 24 from the can 12 and separating gas spaces formed beyond the cathode and anode structures, respectively. The material of separator 20 may consist of laminated or composite materials or combinations thereof. Typically separator materials comprise an absorbent fibrous sheet material wettable by the electrolyte, and an insulating material being impermeable to small particles but retaining ionic permeability.

While the bobbin cell construction is a simple design that allows for high-speed, low-cost manufacturing, the surface area between the anode and cathode in a conventional bobbin cell is limited to the geometrical surface area of the cylinder of separator between the anode and cathode. Thus, for a bobbin cell, the anode to cathode interfacial surface area ($S_i$) constituted by the interposed straight cylinder of separator is necessarily a fraction of the external surface area ($S_e$) formed by the cylindrical wall of the can $[(S_i)/(S_e)<1]$.

In the field of batteries, the surface area of—and between—the electrodes of an electrochemical cell is understood to be an important design element, since the mass transport flux of ions between anode and cathode (typically slower than electron transfer or chemical kinetics) can be a rate limiting or current limiting physical process. It is not only the ionic conductivity and surface area between the anode and cathode that is important but also the microporosity and surface area inside the electrodes.

It is possible to arrange for greater electrode and interfacial area within a cylindrical cell. The most widely used cylindrical cell design alternative to the bobbin cell is the spirally wound or jelly-roll construction which is well described in the Handbook of Batteries [$3^{rd}$ Edition, editors D. Linden and T. B. Reddy, Section 3.2.11, McGraw-Hill, 2002]. In this construction thin strips of anode and cathode with separator between them are tightly wound together. The electrodes can be as thin as a few tenths of a millimeter and for the spirally wound cylindrical cell the anode to cathode interfacial surface area can be several multiples of the external surface area formed by the cylindrical wall of the can $[(S_i)/(S_e)>>1]$. The greater interfacial area comes at the expense of additional complexity and cost to manufacture. Spiral winding requires precision alignment of anode, cathode, and separator, with lower production rates and higher capital equipment costs than "bobbin" construction cells. The spirally wound design is not typically applied to the alkaline $MnO_2$/Zn cell where it would defeat the economic advantage of the materials, but is applied to more premium electrochemical systems including rechargeable nickel cadmium (NiCd) and nickel metal hydride (NiMH) batteries, and non-rechargeable systems such as lithium iron disulfide (LiFeS$_2$) batteries.

Another trade-off of the spiral wound design is the higher amount of separator and current collector required, which take up volume that could otherwise be utilized for active material. Since a standard size cylindrical cell has a fixed volume, it is most efficiently built with maximum active material and electrolyte in order to maximize its energy content. In the bobbin cell, in addition to lower separator content and thick electrodes, the brass nail anode current collector and cathode current collection via contact with the cylindrical container wall do not significantly intrude on the interior space.

Thus, while converting from a bobbin design to spiral wound design increases the inter-electrode surface area and power capability, it also reduces the energy content of the cell. A spiral wound construction may deliver most of its energy efficiently for discharge rates on the order of 20 C(C refers to a current equivalent to the rated capacity of the cell in ampere-hours divided by 1 hour). Such high rate discharge capability may be essential for applications such as power tools, however is not typically needed for consumer electronics. Even devices such as digital cameras typically operate at more moderate discharge rates on the order of ⅓ to 1C rate.

More costly spirally wound batteries may be over designed for many portable applications. However, for alkaline manganese dioxide cells with a zinc anode and potassium hydroxide electrolyte to maintain their competitive advantage as a universal solution for a wide range of consumer applications, better run time at higher drain rates is needed. Much of the recent patent literature related to the alkaline cell is aimed at addressing this issue.

In addition to material and electrode formulation strategies to improve power capability, there have been a number of strategies to increase the interfacial surface area between the anode and cathode through modifications of the conventional bobbin cell. For example, Urry in U.S. Pat. No. 5,948,561 describes the use of a bisecting conductive plate coated with cathode active material to partition a V-folded tubular separator. Luo et al. in U.S. Pat. No. 6,261,717 and Treger et al. in U.S. Pat. No. 6,514,637 also describe the creation of multiple anode cavities that are in these cases molded into the cathode pellets. Getz in U.S. Pat. No. 6,326,102 describes a relatively more complex assembly with two separate zinc anode structures in contact with the inner and outer contours of separator encased cathode pellets. Jurca in U.S. Pat. No. 6,074,781 and Shelekhin et al. in U.S. Pat. No. 6,482,543 describe stepped interior or contoured interior surfaces of the cathode pellet. Shelekhin et al. in U.S. Pat. No. 6,482,543, Lee et al in U.S. Pat. No. 6,472,099 and Luo et al. in U.S. Pat. No. 6,410,187 describe branched or lobed interior electrode structures.

All of these design strategies have limitations in the effective increase in surface area that is possible and introduce additional complexities that detract from the utilitarian design of the conventional bobbin cell. Some may achieve greater surface area but at the sacrifice of a cell balance change that decreases the energy content. Multi-cavity or multiple electrode designs introduce the need for more complex current collection and end seals. The more complex geometries may introduce orientation requirements and the need for more complex tooling and machinery for assembly. Complex geometries can make it difficult to apply separator uniformly and consistently especially in high-speed production, and may necessitate unconventional approaches such as internally applied conformal coatings.

For example, branched or lobed designs have limited ability to increase surface area unless the lobes are made thinner which makes applying separator and filling uniformly with gelled anode more difficult. If the lobes or branches are not thinner and longer then not much increase in surface is provided and the cell balance may be changed to be less efficient due to changes in relative cross-sectional area of the anode and cathode structures. Alignment of cathode pellets and breakage of pellets in lobed designs could make manufacture difficult.

Among other things, the present invention is intended to address these as well as other shortcomings in the prior art.

SUMMARY OF THE INVENTION

In accordance with the principles of the present invention as embodied and described herein, one particular characterization of the present invention comprises an electrochemical battery cell comprising a cell housing defining an interior space having an interior surface, a first terminal and a second terminal. The cell further comprises an inner electrode encapsulated by a separator and disposed within the interior space of the housing. The inner electrode is in a folded configuration and is formed such that an outer extent of the inner electrode is generally conforming to a contour defined by the interior surface of the cell housing. The inner electrode is in electrical communication with the second terminal of the housing. An outer electrode is disposed within the interior space of the housing such that it is in ionic communication with the inner electrode and in electrical communication with the first terminal of the cell housing.

According to particular aspects of the present invention, the inner electrode is in an accordion-folded configuration or in a W-shaped configuration; the interior surface of the housing is in electrical communication with the first terminal and electrical communication between the outer electrode and the first terminal is established by contact between the outer electrode and the interior surface of the housing; and the inner electrode is an anode and the outer electrode is a cathode, wherein the first terminal has a positive polarity and the second terminal has a negative polarity.

According to another aspect, the inner and outer electrodes interface with each other to define an inter-electrode surface area ($S_i$) and the cell housing further includes an exterior surface defining an exterior surface area ($S_e$). The ratio of the inter-electrode surface area to the external surface area of the housing of the battery cell ($S_i/S_e$) is in the range of about 2 to about 8.

According to another aspect, an electrochemical battery cell comprises a cell housing defining an interior space, a first terminal and a second terminal; and an electrode assembly disposed within the interior space of the housing. The electrode assembly comprises an inner electrode encapsulated by a separator and having a folded configuration, and an outer electrode having a folded configuration intermeshing with the folded configuration of the inner electrode. The electrode assembly is formed such that an outer extent of the electrode assembly is generally conforming to a contour defined by the interior surface of the cell housing. The inner electrode is in electrical communication with the second terminal of the housing and the outer electrode is in electrical communication with the first terminal of the housing.

According to yet another aspect, an electrochemical battery cell comprises a cylindrically-shaped cell housing defining an interior space, a first terminal and a second terminal. The cell further comprises an electrode assembly disposed within the interior space of the housing. The electrode assembly comprises a pair of outer electrodes and an inner electrode encapsulated by a separator and disposed between the outer electrodes. The electrode assembly has a folded configuration such that each of the electrodes intermeshingly engages the other. The electrode assembly is formed such that an outer extent of the electrode assembly is generally conforming to the cylindrically-shaped cell housing. The inner electrode is in electrical communication with the second terminal of the housing and the outer electrode is in electrical communication with the first terminal of the housing.

According to yet another aspect, an electrochemical battery cell comprises a cell housing defining an interior space, a first terminal and a second terminal. The cell further comprises an inner electrode having a linearly geometric configuration having a cross-sectional area substantially less than an exterior surface area of the inner electrode and disposed within the interior space of the housing. The inner electrode is encapsulated by a separator and in electrical communication with the second terminal of the housing. The cell further comprises an outer electrode material disposed and formed within the interior space of the housing such that the inner electrode is embedded therein. The outer electrode is in ionic communication with the inner electrode and electrical communication with the first terminal of the cell housing.

According to yet anther aspect, an electrochemical battery cell comprises a cell housing defining an interior space, a first terminal and a second terminal. The cell further comprises an electrode assembly disposed within the interior space of the housing. The electrode assembly comprises an inner electrode encapsulated by a separator and an outer electrode. The electrodes are intermeshed together to from an interface and compressed such that an outer extent of the electrode assembly is generally conforming to a contour defined by the interior surface of the cell housing. The inner electrode is in electrical communication with the second terminal of the housing and the outer electrode is in electrical communication with the first terminal of the housing.

Methods of manufacturing an electrochemical battery cell in accordance with the principles of the present invention are also contemplated. According to a particular aspect of the present invention, a method of manufacturing an electrochemical battery cell is provided comprising the steps of: providing a battery cell housing including an interior space, a first terminal and a second terminal; providing an inner electrode having a substantially flat configuration and encapsulated by a separator; providing an outer electrode having a substantially flat configuration; disposing the outer electrode adjacent the inner electrode; folding the inner and outer electrodes together into a folded configuration; forming the inner electrode such that an outer extent of the electrodes is generally conforming to a contour defined by the interior space of the cell housing; and disposing the electrodes within the interior space of the housing such that the outer electrode is in electrical communication with the first terminal of the cell housing and the inner electrode is in electrical communication with the second terminal of the cell housing.

Other methods in accordance with the principles of the present invention are contemplated as well.

The methods of manufacturing an electrochemical battery cell in accordance with the principles of the present invention can be readily translated to automated high-speed production. One or more steps of these methods can be envisioned as replacing certain unit operations in a conventional bobbin cell manufacturing plant, with others being similar to those for conventional bobbin manufacturing, while maintaining equivalent throughput rates.

These and other aspects of the present invention will be apparent after consideration of the written description, drawings and claims herein.

DETAILED DESCRIPTION OF THE PREFERRED EMBODIMENTS

While the present invention is capable of embodiment in many different forms, there is shown in the drawings, and will herein be described in detail, one or more specific embodiments with the understanding that the present disclosure is to be considered an exemplification of the principles of the invention and is not intended to limit the invention to these specific embodiments.

The present invention provides a simple and effective design of a battery cell, such as a cylindrical cell, with balanced energy and power characteristics intermediate between the bobbin and spiral wound designs and which retains the advantages of both designs, i.e., low cost, simple manufacturing with higher power, and high internal volume utilization for energy efficiency. In an embodiment, this is achieved by providing a significant but balanced increase of anode to cathode interfacial surface area in conjunction with thinner, high ionic conductivity, electrode structures. The present invention also provides a better balanced alkaline "modified" bobbin design which can be applied to various cell sizes including AAA, AA, C, D and others, so that higher capacity is available at higher drain rates while the favorable energy storage characteristics are retained.

An exemplification of this higher capacity benefit of the present invention is shown in FIG. 1, which demonstrates that the present invention provides a more balanced utilization profile of a AA size cylindrical cell through increased capacity available at higher drain rates, when compared to a commercial high rate alkaline bobbin cell. In the example of FIG. 1, 1.5 Ah or approximately 50% of the theoretical capacity is delivered on the ANSI digital camera test (versus 25% for a typical conventional bobbin cell, as shown in FIG. 1—section A), while still achieving at least equivalent discharge capacities on moderate rate tests such as that for motorized toys (3.9 ohm). Only at the very lowest discharge rates is there any discernable loss of apparent discharge capacity which is nevertheless still at least 70-80% of the theoretical or typical low drain rate capacity of a conventional alkaline bobbin cell. Thus, approximately 50% or more of the theoretical capacity can be obtained at a C/2-C/3 discharge rate while greater than 70% of the theoretical capacity can be achieved at a C/10 discharge rate.

Figure 3:
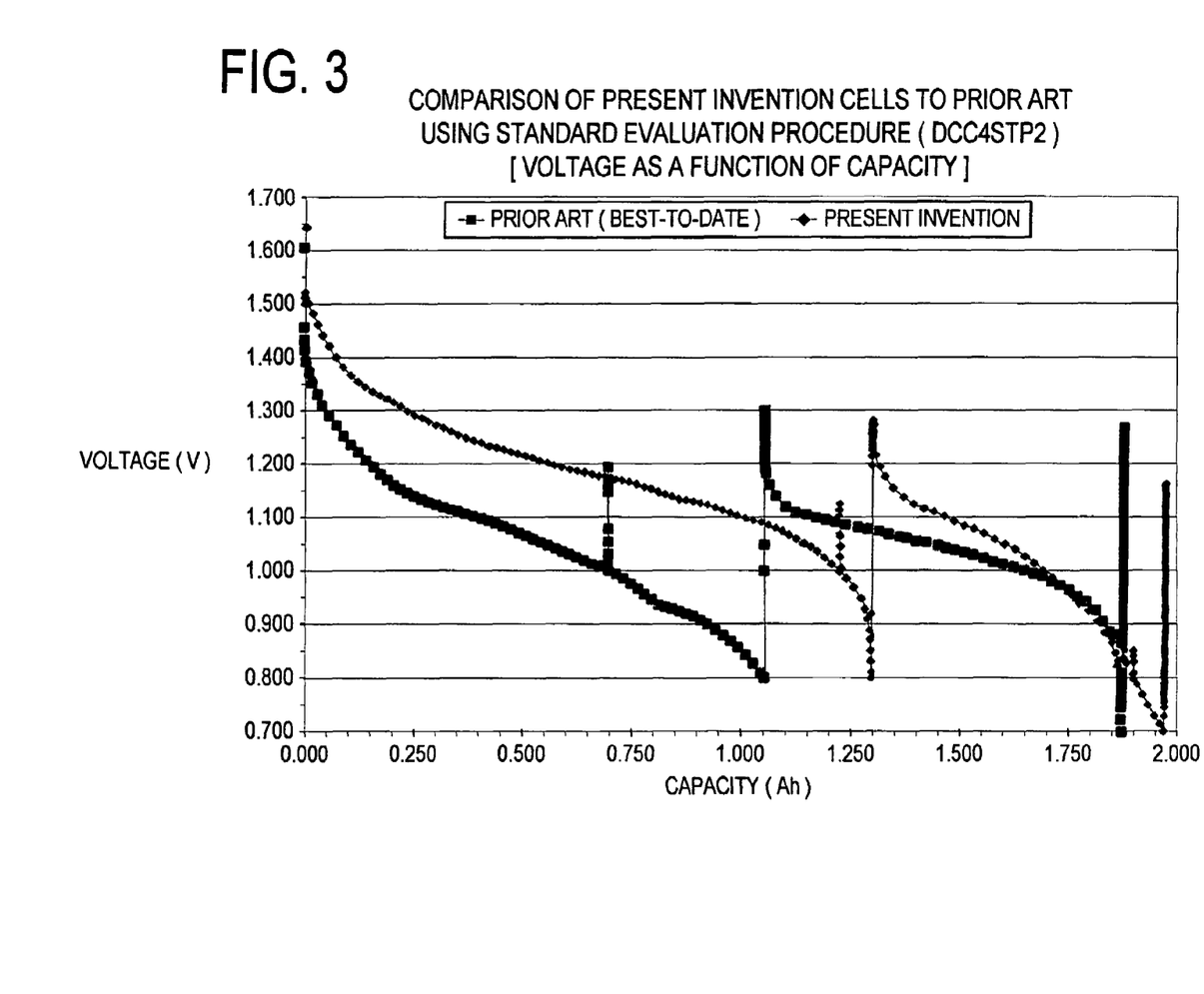
FIG. 3 is a graph depicting cell potential versus discharge capacity for 1 Amp discharge of an embodiment in accordance with the present invention compared to a commercial cell of the prior art.

FIG. 3 shows a comparison of the voltage curves for a conventional alkaline cell compared to the voltage curve under the same discharge conditions for a cell in accordance with the principles of the present invention. As can be seen from FIG. 3, a cell in accordance with the principles of the present invention delivers approximately twice the capacity as the conventional alkaline cell on a 1 ampere discharge to a 1.0 volt cutoff, with approximately equivalent cumulative capacity out as discharge is continued over a 3.9 ohm resistor.

An effective way to characterize the ability of the invention to provide a well-balanced ratio of power to energy is to perform certain tests on assembled cells. The particular test utilized consists of a series of discharge steps to evaluate performance at a high rate discharge followed by a lower rate discharge to evaluate total capacity delivery capability. The specifics of the test for a AA size cell are: (1) a continuous discharge at 1.0 A to a voltage cutoff of 1.0 V; (2) a 30 second open circuit test; (3) a continuous discharge at 1.0 A to a 0.8 V cutoff; (4) a 30 minute open circuit test; (5) a 3.9 Ohm discharge to 0.7 V cutoff. This test is identified by the assignee of the present invention as a DCC4STP2 test. Other size cells may be tested similarly, but with increased or reduced current levels to reflect the capability of the cell size.

By performing tests of this type on cells utilizing the current invention and on conventional bobbin-type alkaline cells, a clear distinction in performance can be established. A capacity delivery ratio ($C_R$) can be calculated by dividing the capacity delivered to 1.0 V at 1.0 A ($C_{1V}$) to the total capacity delivered ($C_T$) in the test. Because the present invention utilizes an effective linearly geometric and thin inner electrode (thin meaning having a cross-sectional area substantially less than an exterior surface area of the inner electrode), the capacity ratio ($C_R$) will be significantly higher than that achieved in conventional bobbin-type alkaline cells.

Having demonstrated some of the performance benefits over conventional cells, the apparatus of battery cells in accordance with the principles of the present invention will now be described. Referring now to the drawings, in which like numerals refer to the like parts throughout the several figures, FIGS. 4A and 4B show an embedded inner electrode design, which is one possible implementation of the current invention.

Figures 4A, 4B:
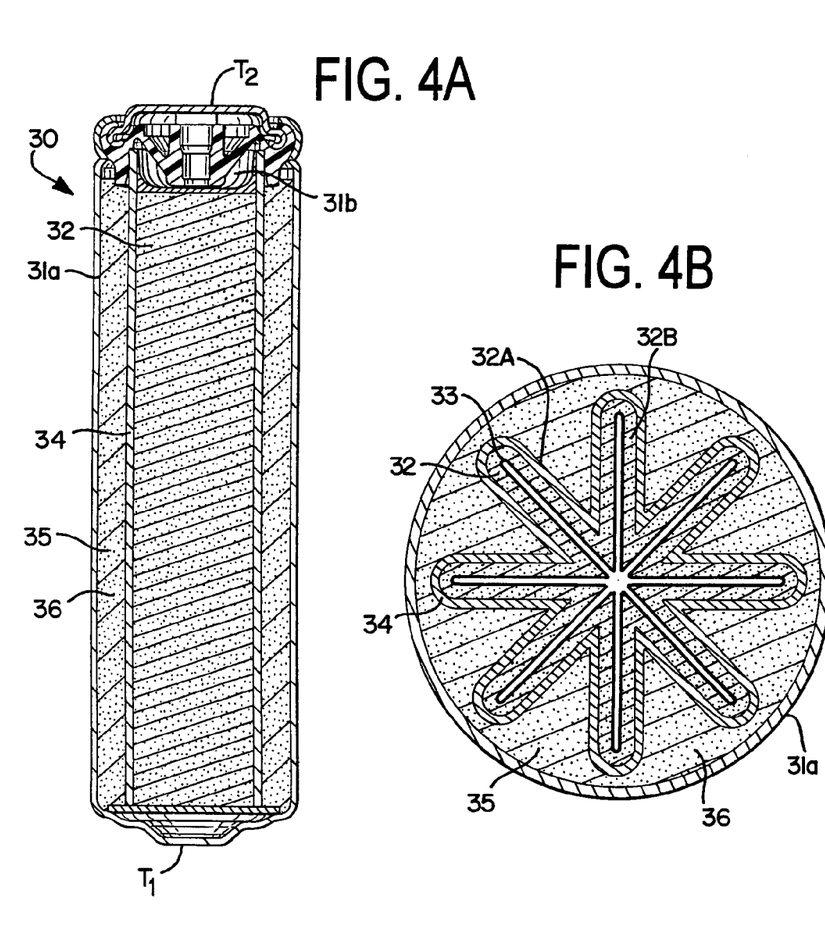
FIGS. 4A and 4B are cross-sectional elevational and plan views, respectively, of an embodiment of the present invention incorporating a linearly geometric inner electrode.

Referring to FIGS. 4A and 4B, a battery cell 30 includes a cell housing 31*a* defining an interior space 31*b* of the battery cell 30. The cell housing 31*a* includes a first terminal T1 and a second terminal T2 for facilitating electrical connection of the cell 30 and electrical communication with other elements of the cell 30. The cell 30 further includes an inner electrode 32, such as an anode, having a thin cross section 32A in a linearly geometric configuration in the form of an asterisk-like shape, which utilizes a plurality of linear elements 32B. Other linearly geometric configurations can be implemented as well, such as a cross-like shape or any other geometry comprising linear elements or similar elements having relatively thin cross sections, i.e., thickness dimensions of its linear elements, compared to the cross section of the cell housing in a similar plane. In a preferred embodiment, the inner electrode has a thickness dimension substantially less than a dimension extending across a maximum span of a cross section of the cell housing taken in parallel to the thickness dimension. In a preferred embodiment, the inner electrode 32 comprises a porous solid extruded composite, which is made of active materials, conductive material and additives. An internally formed current collector 33 may also be included. The inner electrode 32 is disposed within the interior space ~31*b* of the housing 30. The inner electrode 32 is encapsulated by a separator 34 and in electrical communication with the second terminal T2 of the housing 30. An outer electrode material 35, such as a cathode material, is disposed and formed within the interior space 31*b* of the housing such that the inner electrode 32 is embedded therein and forming an outer electrode 36. The outer electrode 36 is in ionic communication with the inner electrode 32 and electrical communication with the first terminal T1 of the cell housing 30. By embedding the inner electrode in the outer electrode, an electrode interface is defined, which can be further defined by an inter-electrode surface area. As shown in FIGS. 4A and 4B, a significant and balanced increase of anode to cathode interfacial surface area is achieved by virtue of the electrode geometry. Further, thinner, high ionic conductivity, electrode structures are achieved by virtue of the thin cross sections of the inner electrode. Performance characteristics of the cell can be changed by changing the electrode geometry, which affects the interfacial surface area between the electrodes.

Since the inner electrode 32 is a porous solid structure, the elements 32B can be thinner and longer than lobes or branches of prior art designs. For example, in a AA cell, the inner electrode 32 may be extruded into a shape that has thin elements 32B only 0.040-0.080 inches thick, whereas the equivalent anode diameter in a conventional AA alkaline cell would be about 0.30 inches. In this case, the inner electrode 32 can be accessed from each side of the element 32B with the maximum effective diffusion thickness equal to one half the through thickness. By using a solid inner electrode, not only can thinner geometric elements be achieved—by virtue of not needing to fill a narrow void with gel as with prior designs—but the conformal coated separator 34 can be applied to an external surface 37 of the inner electrode 32 by dipping or spraying—rather than attempting to apply a separator to the inner surface of a complex geometry outer electrode as with prior designs. The outer electrode 36 can then be applied around the separator encased inner electrode 32, either external to the cell housing 31 or after the inner electrode is disposed within the cell housing 31. In an embodiment wherein the outer electrode is applied within the housing 30, the inner electrode 32, in the form of an anode and having a linearly geometric configuration, can be inserted into the housing 31 which can then filled with a cathode powder and pressed to form an embedded inner electrode 32.

Figures 5A, 5B, 5C, 5D, 6:
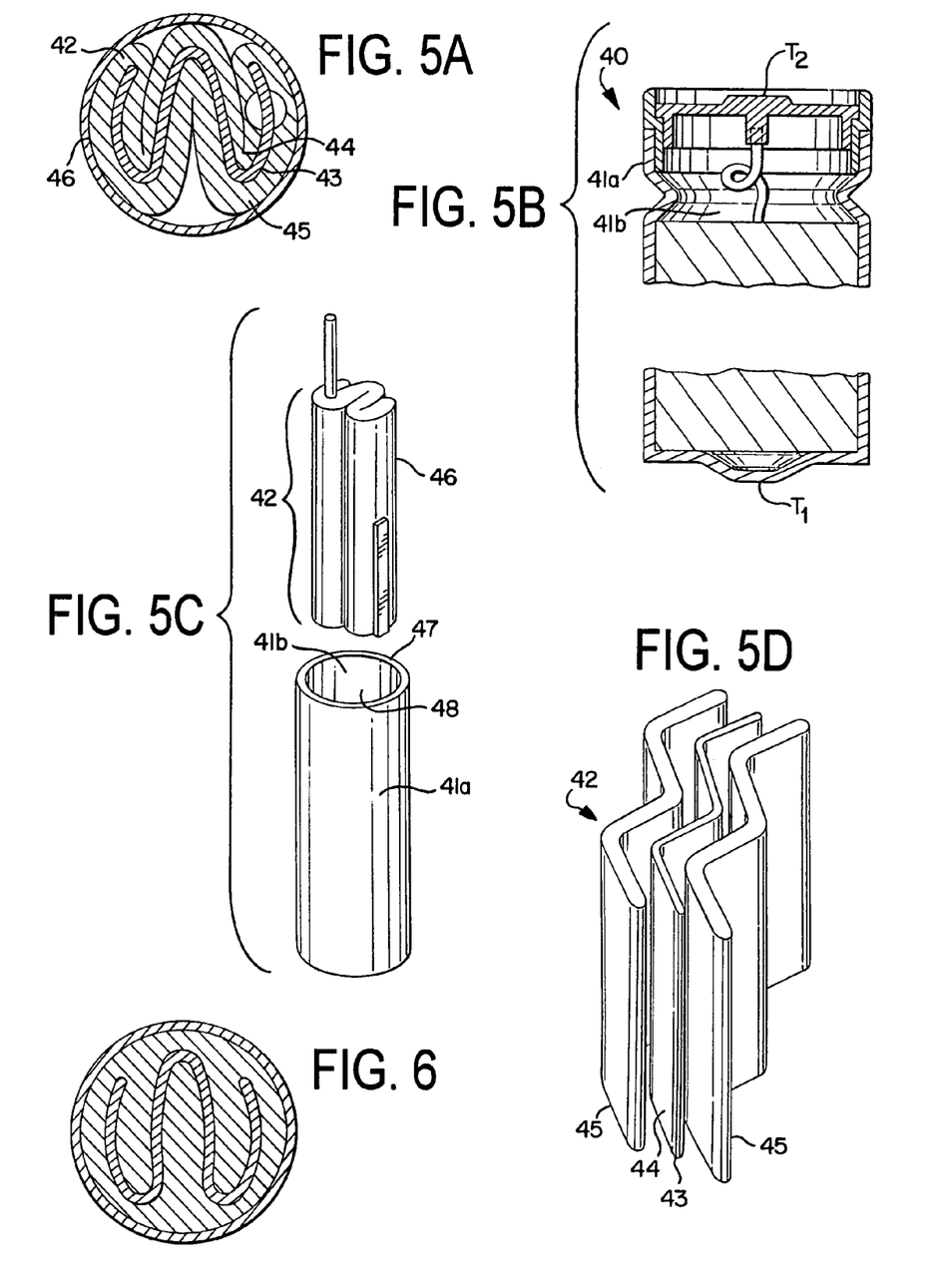
FIG. 5A is a cross-sectional plan view of a preferred embodiment incorporating a corrugated fold electrode assembly in accordance with the present invention.
FIG. 5B is a partial cross-sectional elevational view of the embodiment of FIG. 5A.
FIG. 5C is an assembly view of the embodiment of FIG. 5A.
FIG. 5D is a perspective view of an electrode assembly prior to formation to fit within a housing, in accordance with the principles of the present invention.
FIG. 6 is a cross-sectional plan view of an embodiment in accordance with the principles of the present invention having a corrugated fold anode embedded in a cathode material.

Another way of achieving the embedding of the inner and outer electrodes in the cell housing would be to bend or fold the electrodes together externally to the housing to form an electrode geometry, mold the electrodes into a shape or contour conforming to the housing, and then inserting them together into the housing. Referring now to FIGS. 5A-5D, a preferred implementation of the present invention can be achieved by starting with a simple inner electrode geometry, covering it with a separator and surrounding it with an outer electrode material and then forming the geometry needed to fit the cell container. As shown in FIGS. 5A-5C, an electrochemical battery cell 40 includes a cell housing 41a defining an interior space 41b. The cell housing 41a includes a first terminal T1 and a second terminal T2 for facilitating electrical connection of the cell 40 and electrical communication with other elements of the cell 40. Referring to FIG. 5A, the cell further includes an electrode assembly 42 disposed within the interior space 41b of the housing 41a. The electrode assembly 42 comprises an inner electrode 43 encapsulated by a separator 44 and an outer electrode 45. The inner electrode and the outer electrode have a thin cross section and are in a folded configuration, such as a "W" folded configuration as shown in FIG. 5D, or other folded configuration such as an accordion fold, such that each of the intermesh with each other. Referring to FIG. 5C, the electrode assembly 42 is formed such that an outer extent 46 of the electrode assembly 42 is generally conforming to a contour 47 defined by an interior surface 48 of the cell housing 40. The inner electrode 43 is in electrical communication with the second terminal T2 of the housing 41a and the outer electrode 45 is in electrical communication with the first terminal T1 of the housing 41a. The interior surface 48 is preferably in electrical communication with the first terminal T1, such that electrical communication between the outer electrode 45 and the first terminal T1 can be established by contact between the outer electrode 45 and the interior surface 48 of the housing 41a.

As shown in FIG. 5D, the inner electrode 43 can be wrapped or conformal coated with the separator 44 and then sandwiched or intermingled with an outer electrode 45 to form the electrode assembly 42. The resulting electrode assembly can then be shaped into various geometries to fit into the housing 41a, as shown in FIG. 5C. The interface between the inner and the outer electrodes is thus not a uniform cylinder, as with prior designs, but may be of complex shape such that the separator covered surface of the encapsulated inner electrode will have an external surface area that is greater than the surface area of a conventional bobbin cell, but less than the surface area of a conventional spirally wound cell. The encapsulated inner electrode is thinner than in a conventional bobbin cell but not as thin as in spiral wound cell. The design achieves a better balance of surface area so that less separator and current collector is used for the encapsulated electrode cell than for a conventional spiral wind design thereby increasing the volume available for active material and thus the energy content.

In an alternate embodiment as shown in FIG. 6, the inner electrode 43 and separator 44 can be embedded in an outer electrode material. In such an embodiment, the outer electrode material can be applied within the housing 41a after the inner electrode 43 is disposed therein, and pressed to form an embedded inner electrode 43 within the cathode material. Alternatively, the inner electrode 43 and separator 44 can be folded into a folded configuration, such as a "W" configuration, and then formed into a geometry generally conforming to the shape of the cell housing 41a. This inner electrode 43 can then be embedded into a cathode material 45 that is extruded into a geometry generally conforming to the shape of the cell housing 41a. The extruded cathode material/embedded anode results in an electrode assembly that can then be disposed within the cell housing 41a.

The present invention facilitates an increase in anode to cathode interfacial surface area such that the ratio of interelectrode surface area ($S_i$) to external surface area of the cell container or housing ($S_e$), i.e., ($S_i$)/($S_e$), may be in the range of 2 to 8 for a AAA or AA cell, (or possibly higher for larger diameter cell sizes like C or D) in order to markedly enhance high rate discharge characteristics. The increased interfacial area provides for a cell design with internal resistance that is a fraction of that of a bobbin cell constructed of equivalent materials. In the examples set forth herein below, the impedance measured at 1 KHz was 70% or less of that of a conventional bobbin cell. Power and energy content are better balanced so that the present invention retains greater than 70-80% of the energy content of a conventional bobbin at moderate rate while increasing the utilization at high power.

A particular embodiment of the present invention provides an inner electrode that has thinner average throughthickness measure than the equivalent inner electrode in a conventional bobbin cell. By thinning the inner electrode through-thickness the surface area can be increased significantly by lengthening the cross dimension so that approximately the same optimal anode to cathode cell balance can be maintained. The decreased through-thickness dimension of the inner electrode provides shorter diffusion lengths, which further enhances power capability of the cell. A conventional alkaline AA size bobbin cell has a cathode ring wall thickness of approximately 0.1 to 0.15 inches and an anode core thickness of approximately 0.2 to 0.3 inches, whereas an alkaline AA cell in accordance with the principles of the present invention may have a cathode thickness of approximately 0.035 to 0.070 inches and an anode thickness of only 0.020 to 0.060 inches.

Another benefit of the present invention is the increased utilization of the inner electrode at high discharge rates. A conventional bobbin cell has a low utilization at high rates because of the internal cylindrical geometry. As the discharge of the anode proceeds radially inwards from the inner surface of the separator, the anode to cathode interfacial surface area is constantly decreasing. This effectively increases the current density at the discharging inner electrode surface and leads to shutdown of the discharge reaction due to transport limitations. Increasing the surface area and thinning the inner electrode maintain a more uniform current density throughout the discharge leading to increased utilization of the inner electrode material.

In a preferred embodiment, the longitudinal dimensions of the inner and outer electrodes are approximately equal to the full internal height of the container minus the height required for the seal, which is typically at least 70% of the internal height so that the electrode composite occupies nearly the full length of the container and maximizes energy content. The outer electrode is preferably formed to be in direct contact with the interior surface of the housing and current collection from this outer electrode is principally via contact with and through the metal housing. The inner electrode is encased in separator and then embedded in an outer electrode matrix material, or sandwiched or formed with the inner electrode, wherein an insulated lead is brought out and then inserted into the housing so that the outer electrode contacts the inner surface of the housing.

In the case of an alkaline $MnO_2$/Zinc cell, to which many of the exemplifications herein refer, the zinc anode is the inner electrode and the $MnO_2$ cathode is the outer electrode which makes contact with the interior surface of the housing for a positive polarity contact. Note that while many examples herein consider the alkaline cell specifically, it is understood that the principles of the present invention can be applied to other electro-chemistries and formats.

According to a particular embodiment of the present invention, an alkaline manganese dioxide-zinc cell is provided comprising a manganese dioxide cathode, a zinc anode, a separator between the anode and cathode, and an aqueous alkaline potassium hydroxide electrolyte. The anode has a non-circular cross section with a short diffusion length relative to a conventional bobbin design anode such that the capacity of the active material is more distributed throughout the interior of the cross-section and cumulative cross-sectional perimeter which is more than twice the cell housing diameter. The anode is wrapped in separator and embedded in the cathode matrix which fills the space between the anode and the interior surface of the housing uniformly. The cell has a well-balanced ratio of power to energy and gets good capacity utilization at high discharge rate. In the case of a AA cell, this is exemplified by achieving greater than 1.2 Ah on a 1 Amp to 1 Volt discharge test.

In a preferred embodiment, the present invention provides a cell comprising a substantially planar or substantially flat separator encapsulated zinc anode and one or two planar shaped cathodes that are formed into a an accordion fold shape and then the whole cathode/anode assembly molded to fill the container.

The cathode structures are formulated such that they have the necessary physical integrity and electronic conductivity to permit handling in high speed production as well as to provide good electron transfer characteristics from the interior of the folds to the cell container wall. This can be accomplished by formulating the composite cathode with conductive fillers, reinforcing materials, binders or carrier webs. A particular means of achieving the necessary mechanical and electronic properties may be to apply a metal foil or mesh to the outer face of the cathode mass such that this metal structure provides an electronic contact to the interior surface of the housing and a continuous electrical connection to the interior of the folds.

Methods of manufacturing an electrochemical battery cell in accordance with the principles of the present invention are also contemplated, as should be apparent from the foregoing description. According to a particular aspect of the present invention, a method of manufacturing an electrochemical battery cell is provided comprising the steps of: (A) providing a battery cell housing including an interior space, a first terminal and a second terminal; (B) providing an inner electrode having a thin and substantially flat configuration and encapsulated by a separator; (C) providing an outer electrode having a thin and substantially flat configuration; (D) disposing the outer electrode adjacent the inner electrode; (E) folding the inner and outer electrodes together into a folded configuration; (F) forming the inner electrode such that an outer extent of the electrodes is generally conforming to a contour defined by the interior space of the cell housing; and (G) disposing the electrodes within the interior space of the housing such that the outer electrode is in electrical communication with the first terminal of the cell housing and the inner electrode is in electrical communication with the second terminal of the cell housing.

According to another particular aspect of the present invention, a method of manufacturing an electrochemical battery cell in the case of forming the outer electrode within the housing is also contemplated. The method comprises the steps of: (A) providing a battery cell housing including an interior space, a first terminal and a second terminal; (B) providing an inner electrode having a thin cross section in a linearly geometric configuration and encapsulated by a separator; (C) disposing the inner electrode within the interior space of the housing such that it is in electrical communication with the second terminal of the cell housing; (D) disposing an outer electrode material within the interior space of the cell housing such that the inner electrode is embedded therein and is in electrical communication with the first terminal of the housing; and (E) pressing the outer electrode material disposed within the interior space of the cell housing.

Other methods and variations of these particular methods are contemplated and are considered within the scope of the present invention when understood by one of ordinary skill in the art after consideration of the descriptions herein.

Figure 7:
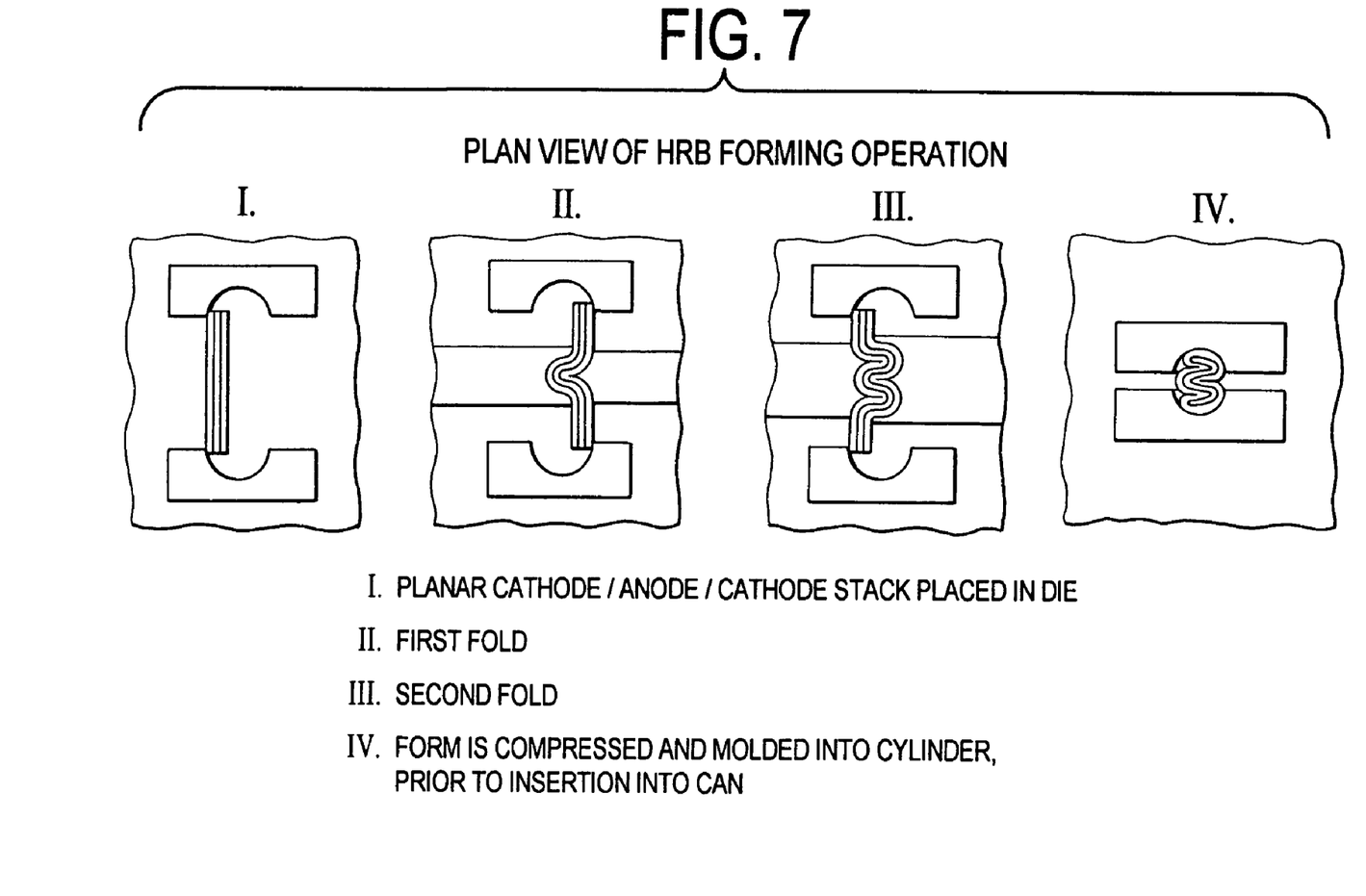
FIG. 7 is a schematic diagram depicting various stages in an assembly sequence in accordance with the principles of the present invention.
Figures 8, 9:
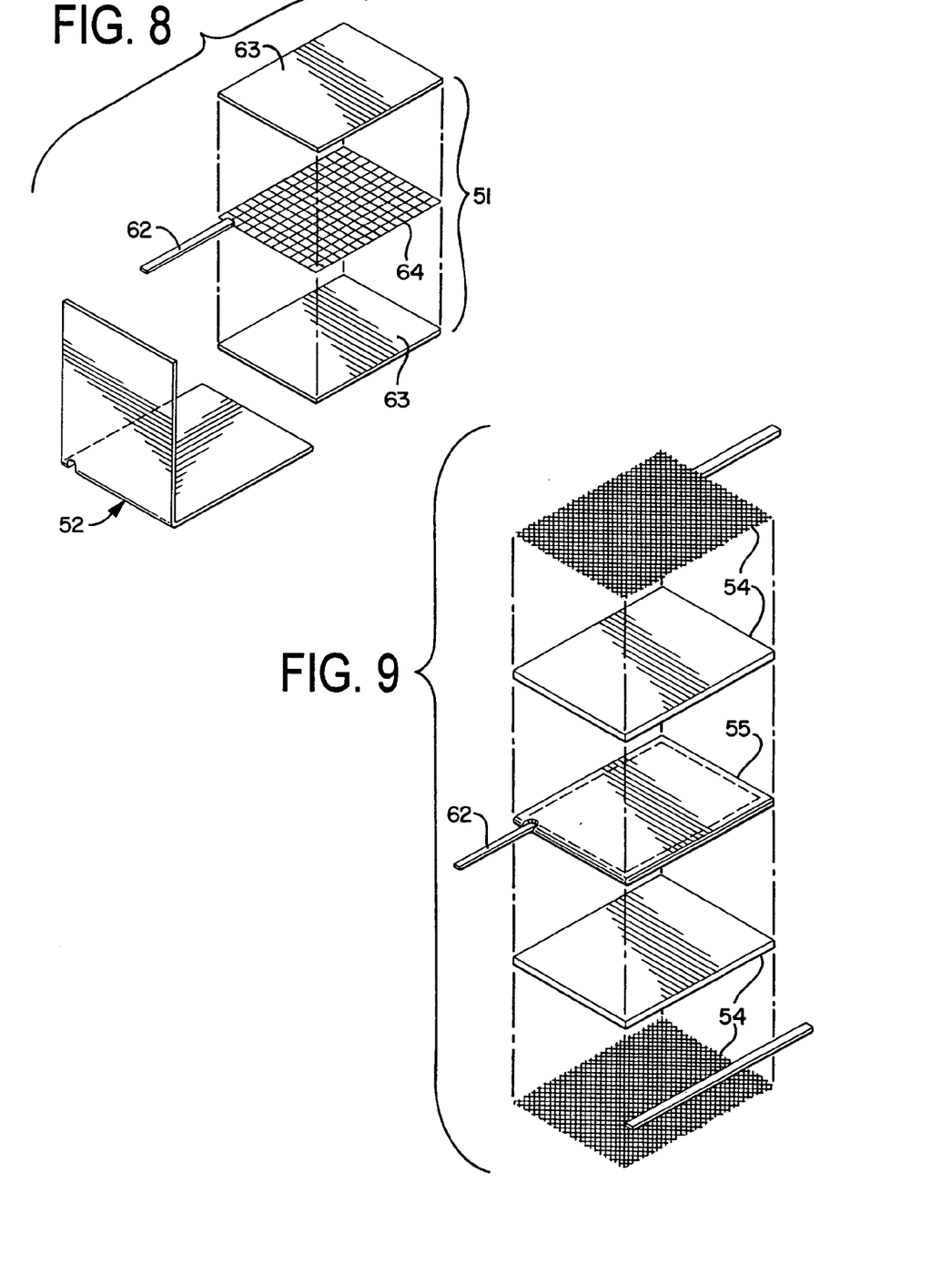
FIG. 8 is a schematic diagram depicting an assembly in accordance with the principles of the present invention.
FIG. 9 is a schematic diagram depicting an assembly in accordance with the principles of the present invention.
Figure 10:
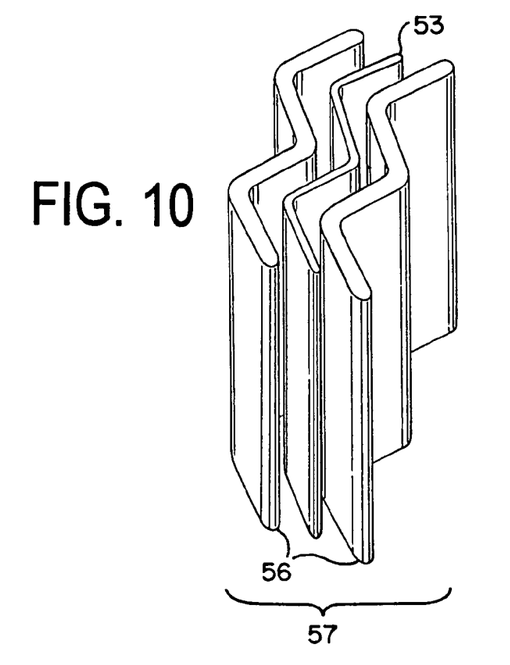
FIG. 10 is a perspective view of an electrode assembly prior to formation to fit within a housing, in accordance with the principles of the present invention.
Figure 11:
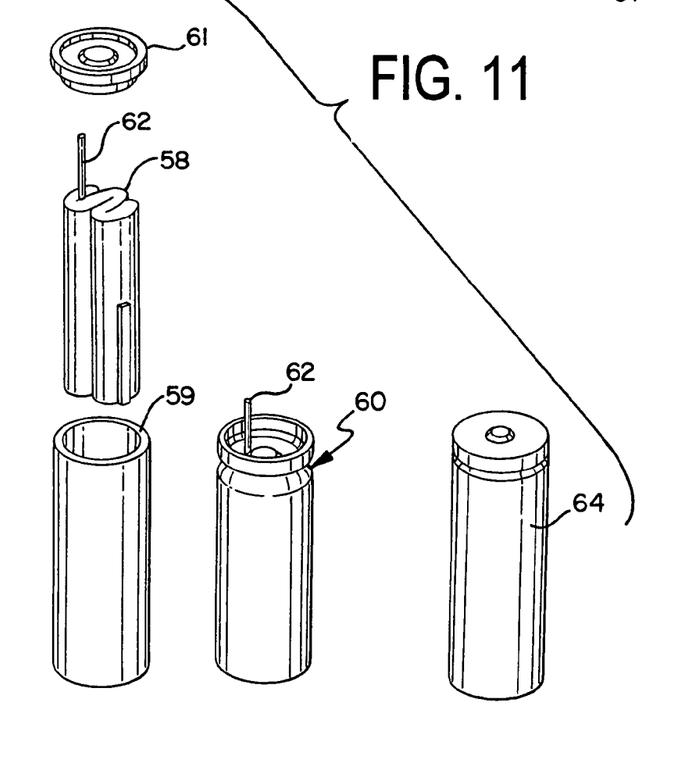
FIG. 11 is an assembly view of an embodiment in accordance with the principles of the present invention.

FIG. 7 illustrates the sequence whereby the preferred embodiment may be manufactured by a series of process steps from parts with simple geometries and low orientation requirements. In FIG. 7 (Step I), a planar cathode/separator-wrapped-anode/cathode stack is placed in a forming die, with the metal substrate on each cathode facing out from the stack. In FIG. 7 (Step II) and (Step III), shaped blades are pushed into the die cavity in a manner to cause folding and shaping of the stack. FIG. 7 (Step IV) shows the final shaping operation to compress and mold the stack into a cylinder prior to insertion in the housing or can.

In a particular embodiment in accordance with the principles of the present invention, a simple method of manufacturing is provided by which a preferred embodiment is achieved. According to a particular embodiment, two cathodes are formed onto die punched metal substrates and placed adjacent to a centrally placed separator encased anode structure. Thus positioned, the electrodes are intermingled and shaped by shaping dies applied perpendicular to the long axis of the electrodes. The final die is a concentric clamshell that forms the outer extent of the electrodes to conform to a contour or shape of the cell housing, such as a cylinder. After forming, the die opens slightly to allow the cylindrically formed integrated electrodes to be pushed into a cell housing positioned adjacent to the forming die. After the electrode assembly is in the housing, additional KOH electrolyte may be added to the top of the open housing for absorption into the electrodes as it passes to the next operation in sequence. The partially assembled cell at this stage has an approximately centrally placed insulated anode lead wire protruding from the top of the housing. This lead is passed through the center of a plastic bottom seal, and welded to an interior surface of a bottom cover, which is then oriented into its proper placement on the seal. Cell closing and finishing operations are equivalent to a conventional bobbin cell process.

The steps that form the improved cell design of the present invention can be readily translated to automated high-speed production. This formation sequence can be envisioned as replacing certain unit operations in a conventional bobbin cell manufacturing plant, with one or more of the steps being similar to those for conventional bobbin manufacturing. Cathode and gelled zinc anode mixing processes for example are expected to be reasonably similar as for conventional bobbin making. Certain of the modified bobbin assembly process operations may even be carried out with altered forms of the basic process equipment now used, with equivalent throughput rates.

To demonstrate and exemplify the principles of the present invention, several examples will now be given. The following examples apply to a general purpose $MnO_2/Zn$ AA cell that can provide greater runtime in a digital camera application, that is, the cell can deliver more capacity on a 1 Amp to 1 Volt discharge compared to a conventional $MnO_2/Zn$ AA cell. In addition the energy content of the cell is not excessively compromised such that reasonable capacity is still available at a moderate rate (3.9 ohm) discharge. Example cells were tested with a 1 Amp discharge to 0.8 Volt, recording the capacity achieved when the cell potential reaches 1 Volt, thereby simulating the ANSI digital camera test. After a 30 minute rest, there is an additional discharge step at 3.9 ohms to 0.7 volts. The 1 Amp to 1 Volt capacity ($C_{IV}$), total capacity delivered ($C_T$), and capacity ratio ($C_R$) tabulated below, are indications of the high rate and low rate capacity utilization efficiency. The data in Table 1 relates to the specific examples presented and shows that the invention increases utilization on the digital camera test while not affecting utilization on low rate tests, demonstrating the benefit of the present invention over the prior art.

TABLE 1

| Example Number | $C_{IV}$ (Ah) | $C_T$ (Ah) | $C_R$ |
|---|---|---|---|
| 1 | 1.2 | 2.0 | 0.60 |
| 2 | 1.1 | 1.8 | 0.61 |
| 3 | 1.2 | 1.9 | 0.63 |
| 4 | 1.35 | 2.0 | 0.68 |
| Conventional premium bobbin | 0.75 | 2.0 | 0.38 |

The examples refer to AA cells in Ni-coated steel cans of standard dimensions. The cathode formulation may be of any type that is typical of primary alkaline cells consisting of EMD ($\gamma$-$MnO_2$), conductive powder, and the remainder being other additives such as binders and electrolyte. The electrolyte is an aqueous alkaline solution of usually 4N to 12N potassium hydroxide. The electrolyte may contain dissolved zinc oxide, ZnO, surfactants and other additives, so as to reduce the gassing of the active zinc within the negative electrode.

The $MnO_2$ cathode premix formulation used in Examples I-VI consisted of a premix of Kerr-McGee High Drain EMD 69.4%, Acetylene Black 5.2%, KS-15 Graphite 2.6%, PTFE-30 Suspension 0.4%, and 9 N KOH 22.4%, on a weight basis. Mixing was carried out in a Readco mixer, ball mill, or other suitable mixer. The cathode premix was further mixed in the ratio of 100 g of mix to 1 g PTFE-30 suspension and 10 g of 9 N KOH solution in order to improve the pasting characteristics and for adhesion to the Ni substrate. The standard substrate was non-annealed expanded metal (Dexmet 3 Ni5-077). Seven grams of the cathode formula was pressed onto the substrate in a Carver press to give a cathode assembly thickness of about 0.047 inches. There was some loss of electrolyte (approx. 0.5-1.0 g) on pressing.

EXAMPLE 1

This is an example of the "embedded corrugated-fold" design as shown in FIGS. 5A-5D. In this example, a porous solid electroformed zinc is utilized as the anode. Referring generally to FIGS. 8-11 for all of the examples, a planar electroformed zinc is utilized as an anode sub-assembly 51 of approximately 1.5" W×1.625" H. The electroformed zinc anode sub-assembly 51 was formed by pasting a zinc oxide/binder slurry 63 onto a thin metal substrate 64 of silver or copper with an attached insulated lead 62 and then electroforming in an alkaline bath. The anode sub-assembly 51 was then washed and dried, and heat-sealed in a pouch of Scimat 700/70 separator 52 to form an anode assembly 55. The anode used was approximately 4.7 g in the dry state and 0.045 inches dry thickness including substrate and lead. The dry anode assembly 55 was soaked in 9 N KOH for at least one hour prior to being folded into a loose corrugated "W" shape 53. Two planar $MnO_2$ cathodes coated onto a perforated metal substrate 54 and with an overlay of 9 N KOH soaked KC16 absorber were placed, such that one was on each side of the anode and folded to conform as intermeshing "W's" 56, resulting in an electrode assembly in the form of a corrugated stack 57. The corrugated stack 57 was pressed and molded into a cylindrical shape 58 in a compression die with a 0.500 inch to 0.515 inch diameter bore prior to insertion into a cell housing or can 59. The thickness of the electrode stack 57 was adjusted so that it was not too thin to fill the can after forming or too thick so as become over compressed losing porosity and electrolyte on insertion into the can 59. After insertion into the can 59, a sealing bead 60 was formed in the upper part of the can 59. The anode lead 62 was attached to a lid 63 and the can was closed to form a complete cell 64.

EXAMPLE 2

This example illustrates the "embedded corrugated-fold" design shown in FIGS. 5A-5D, specifically utilizing pasted zinc in an anode sub-assembly. This anode is fabricated from zinc powder using an extrusion or pasting process to form an anode sheet. The anode sub-assembly was prepared by mixing powdered metallic zinc or zinc alloys and zinc oxide together with a Kraton binder and Shellsol solvent. The mixture was pasted onto a 0.002 inches thick perforated copper foil substrate with an attached lead and the solvent was allowed to evaporate. The sub-assembly was then wrapped in an SM700/70 separator to form the anode assembly. The dry anode assembly was soaked in 9 N KOH for at least one hour prior to being folded into a loose corrugated "W" shape. Two planar $MnO_2$ cathodes coated onto a perforated metal substrate and with an overlay of 9 N KOH soaked KC16 absorber were placed, such that one was on each side of the anode and folded to conform as intermeshing "W's." The corrugated stack was pressed and molded into a cylindrical shape in a compression die with a 0.500 inch to 0.515 inch diameter bore prior to insertion into the housing or can. The thickness of the electrode stack was adjusted so that it was not too thin to fill the can after forming or too thick so as become over compressed losing porosity and electrolyte on insertion into the can. After insertion into the can, a sealing bead was formed in the upper part of the can. The anode lead was attached to the lid and the can was closed to form a complete cell.

EXAMPLE 3

This example illustrates the "embedded corrugated-fold" design shown in FIGS. 5A-5D utilizing zinc gel to form the anode assembly. The zinc gel comprised powdered metallic zinc or zinc alloys and optionally zinc oxide together with a suitable gelling agent such as carboxymethyl cellulose, polyacrylic acid, starches, and their derivatives. An anode current collector with an attached lead was placed in a pouch prepared out of the Scimat SM700/79 separator and 7 g of the gel was added into the pouch which was then heat sealed at the bottom to form the anode assembly. Two planar $MnO_2$ cathodes coated onto a perforated metal substrate and with an overlay of 9 N KOH soaked KC16 absorber were placed, such that one was on each side of the anode assembly and folded to conform as intermeshing "W's." The corrugated stack was pressed and molded into a cylindrical shape in a compression die with a 0.500 inch to 0.515 inch diameter bore prior to insertion into the housing or can. The thickness of the electrode stack was adjusted so that it was not too thin to fill the can after forming or too thick so as become over compressed losing porosity and electrolyte on insertion into the can. After insertion into the can, a sealing bead was formed in the upper part of the can. The anode lead was attached to the lid and the can was closed to form a complete cell.

EXAMPLE 4

This example illustrates the "embedded corrugated-fold" design shown in FIGS. 5A-5D utilizing zinc gel with added zinc fibers to form the anode assembly. The zinc gel comprised powdered metallic zinc or zinc alloys, 5% of Alltrista ⅛" zinc fibers, and optionally zinc oxide together with a suitable gelling agent such as carboxymethyl cellulose, polyacrylic acid, starches, and their derivatives. An anode current collector with attached lead was placed in a pouch prepared out of a Scimat SM700/79 separator and 7 g of the gel/fiber mix was added into the pouch which was then heat sealed at the bottom to form the anode assembly. Two planar $MnO_2$ cathodes coated onto a perforated metal substrate and with an overlay of 9 N KOH soaked KC16 absorber were placed, such that one was on each side of the anode assembly and folded to conform as intermeshing "W's." The corrugated stack was pressed and molded into a cylindrical shape in a compression die with a 0.500 inch to 0.515 inch diameter bore prior to insertion into the housing or can. The thickness of the electrode stack was adjusted so that it was not too thin to fill the can after forming or too thick so as become over compressed losing porosity and electrolyte on insertion into the can. After insertion into the can, a sealing bead was formed in the upper part of the can. The anode lead was attached to the lid and the can was closed to form a complete cell.

Other manifestations of the "embedded corrugated-fold" design of the present invention are anticipated. For example the assembly and process variables such as: anode weight, anode soak time, degree of compression, cathode formulation, cathode substrate, and cathode-to-can current collection can be "fine tuned" to maximize electrical performance of the embedded "W" design. Almost all of the cells were built with the 0.515 inch diameter compression die which was adapted over the previous standard 0.5 inch diameter die based largely on the clear observation that less electrolyte is squeezed out during assembly. It is important to retain enough electrolyte in the cell to facilitate performance.

It is also possible to vary the length of the electrodes or length and number of folds to provide more optimal surface area and filling of the container, than given in the W-fold described in the examples. Rather than using two outer cathode assemblies, a single length of cathode may be wrapped around the separator-encased anode and then folded into a corrugated structure. An alternate means to increase surface area is for multiple layers of cathode and anode to be used in the stack to be corrugated, for example: cathode/anode/cathode/anode/cathode.

While specific embodiments have been illustrated and described herein, numerous modifications may come to mind without significantly departing from the spirit of the invention, and the scope of protection is only limited by the scope of the accompanying claims.

What is claimed is:

1. An electrochemical battery cell comprising:
a cell housing defining an interior space having an interior surface, a first terminal and a second terminal;
an inner electrode encapsulated by a separator and disposed within the interior space of the housing, the inner electrode comprising a substantially flat material in a folded configuration and formed such that an outer extent of the inner electrode is generally conforming to a contour defined by the interior surface of the cell housing, the inner electrode in electrical communication with the second terminal of the housing; and
an outer electrode disposed within the interior space of the housing such that it is in ionic communication with the inner electrode and in electrical communication with the first terminal of the cell housing, wherein the cell has a capacity ratio ($C_R$) in a range from 0.5 to 0.68.

2. The battery cell of claim 1, wherein the inner electrode is in an accordion-folded configuration.

3. The battery cell of claim 1, wherein the inner electrode is in a W-shaped configuration.

4. The battery cell of claim 1, wherein the contour defined by the interior surface is generally cylindrically shaped.

5. The battery cell of claim 1, wherein the interior surface of the housing is in electrical communication with the first terminal and electrical communication between the outer electrode and the first terminal is established by contact between the outer electrode and the interior surface of the housing.

6. The battery cell of claim 1, wherein the inner electrode is an anode and the outer electrode is a cathode, and wherein the first terminal has a positive polarity and the second terminal has a negative polarity.

7. The battery cell of claim 6, wherein the anode comprises zinc.

8. The battery cell of claim 6, wherein the cathode comprises manganese dioxide.

9. The battery cell of claim 1, wherein the inner and outer electrodes interface with each other to define an inter-electrode surface area ($S_i$) and the cell housing further includes an exterior surface defining an exterior surface area ($S_e$), and wherein the ratio of the inter-electrode surface area to the external surface area of the housing of the battery cell ($S_i/S_e$) is in the range of about 2 to about 8.

10. An electrochemical battery cell comprising:
a cell housing defining an interior space, a first terminal and a second terminal; and
an electrode assembly disposed within the interior space of the housing, the electrode assembly comprising:
an inner electrode encapsulated by a separator and in a folded configuration; and
an outer electrode having a folded configuration intermeshing with the folded configuration of the inner electrode;
the electrode assembly formed such that an outer extent of the electrode assembly is generally conforming to a contour defined by the cell housing, the inner electrode in electrical communication with the second terminal of the housing and the outer electrode in electrical communication with the first terminal of the housing; and, a second outer electrode having a folded configuration, wherein the inner electrode is disposed between the outer electrodes, wherein the cell has a capacity ratio ($C_R$) in a range from 0.5 to 0.68.

11. The battery cell of claim 10, wherein the electrodes of the electrode assembly are in an accordion-folded configuration.

12. The battery cell of claim 10, wherein the electrodes of the electrode assembly are in a W-shaped configuration.

13. The battery cell of claim 10, wherein the contour defined by the interior surface is generally cylindrically shaped.

14. The battery cell of claim 10, wherein the inner electrode is an anode and the outer electrode is a cathode, and wherein the first terminal has a positive polarity and the second terminal has a negative polarity.

15. An electrochemical battery cell comprising:

a cylindrically-shaped cell housing defining an interior space, a first terminal and a second terminal; and an electrode assembly disposed within the interior space of the housing, the electrode assembly comprising a pair of outer electrodes and an inner electrode encapsulated by a separator and disposed between the outer electrodes, the electrode assembly having a folded configuration such that each of the electrodes intermeshingly engage each other;

the electrode assembly formed such that an outer extent of the electrode assembly is generally conforming to the cylindrically-shaped cell housing, the inner electrode in electrical communication with the second terminal of the housing and the outer electrode in electrical communication with the first terminal of the housing.

16. The battery cell of claim 15, wherein the electrode assembly is in an accordion-folded configuration.

17. The battery cell of claim 15, wherein the electrode assembly is in a W-shaped configuration.

18. The battery cell of claim 15, the cell housing further defining an interior surface in electrical communication with the first terminal, wherein electrical communication between the outer electrode and the first terminal is established by contact between the outer electrode and the interior surface of the housing.

19. The battery cell of claim 15, wherein the inner electrode is an anode and the outer electrode is a cathode, and wherein the first terminal has a positive polarity and the second terminal has a negative polarity.

20. The battery cell of claim 15, wherein the cell has a capacity ratio ($C_R$) greater than 0.5.

21. The battery cell of claim 15, wherein the cell has a capacity ratio ($C_R$) in a range from 0.5 to 0.68.

22. An electrochemical battery cell comprising:

a cell housing defining an interior space, a first terminal and a second terminal; and an electrode assembly disposed within the interior space of the housing, the electrode assembly comprising an inner electrode encapsulated by a separator and an outer electrode, the electrodes intermeshed together to from an interface and compressed such that an outer extent of the electrode assembly is generally conforming to a contour defined by the interior surface of the cell housing, the inner electrode in electrical communication with the second terminal of the housing and the outer electrode in electrical communication with the first terminal of the housing, wherein the cell has a capacity ratio ($C_R$) in a range from 0.5 to 0.68.

23. The battery cell of claim 22, wherein the interface between the inner and outer electrodes has a generally spline-like shape.

24. The battery cell of claim 22, wherein the interface between the inner and outer electrodes has a shape made up of generally linear-shaped segments.

25. The battery cell of claim 22, wherein the interface between the inner and outer electrodes has a shape made up of generally linear-shaped segments and spline-shaped segments.

26. The battery cell of claim 22, wherein the interface defines an inter-electrode surface area ($S_i$) and the cell housing further defining an exterior surface area ($S_e$), and wherein the ratio of the inter-electrode surface area to the external surface area of the housing of the battery cell ($S_i/S_e$) is in the range of about 2 to about 8.

27. An electrode assembly for placement within a housing of an electrochemical battery cell, the assembly comprising:

an inner electrode encapsulated by a separator and in a folded configuration; and an outer electrode having a folded configuration intermeshing with the folded configuration of the inner electrode;

the electrode assembly formed such that an outer extent of the electrode assembly is generally conforming to a contour defined by the cell housing, wherein the contour is generally cylindrically-shaped and wherein the inner electrode is formed in a W-shaped configuration having its outer extent generally conforming to the cylindrically-shaped contour.

28. An electrochemical battery cell comprising:

a cell housing defining an interior space, a first terminal and a second terminal;

an inner electrode having a geometric configuration having a volume and a surface area and being disposed within the interior space of the housing and being in electrical communication with the second terminal of the housing;

an outer electrode material disposed within the interior space of the housing, the outer electrode material having a surface area and being in ionic communication with the inner electrode and in electrical communication with the first terminal of the cell housing;

an electrolyte disposed in the inner space; and, the geometric configuration of the inner electrode having a cross sectional shape with a thickness and length which provide a volume relative to the interior space and a surface area relative to the outer electrode material surface area such that the capacity delivery ratio $C_R$ of the battery cell is between 0.5 to 0.68.

29. The battery cell of claim 28, wherein the cross section of the geometric configuration of the inner electrode has a cross-like shape.

30. The battery cell of claim 28, wherein the cross section of the geometric configuration of the inner electrode has an asterisk-like shape.

31. The battery cell of claim 28, wherein the cross section of the geometric configuration of the inner electrode has a "W"-like shape.

32. The battery cell of claim 31, wherein the "W"-like shape is compressed to generally conform to a contour of the interior space of the cell housing.

33. The battery cell of claim 28, wherein the outer electrode material is formed within the interior space of the housing by being pressed within the interior space.

34. The battery cell of claim 28, the cell housing further defining an interior surface in electrical communication with the first terminal, wherein electrical communication between the outer electrode and the first terminal is established by contact between the outer electrode and the interior surface of the housing.

35. The battery cell of claim 28, wherein the inner electrode is an anode and the outer electrode is a cathode, and wherein the first terminal has a positive polarity and the second terminal has a negative polarity.

36. A method of manufacturing an electrochemical battery cell having a battery cell housing including an interior space, a first terminal and a second terminal, the method comprising the steps of:
   forming an inner electrode outside of the battery cell housing;
   encapsulating the inner electrode in a separator material;
   inserting the inner electrode and the separator material into the interior space of the housing such that it is in electrical communication with the second terminal of the cell housing; and,
   inserting an outer electrode material within the interior space of the cell housing such that the inner electrode and the separator material are embedded therein and is in electrical communication with the first terminal of the housing, and wherein the electrochemical battery cell has a capacity ratio ($C_R$) in a range from 0.5 to 0.68.

37. The method of claim 36 further comprising the step of pressing the outer electrode material disposed within the interior space of the cell housing.

38. The method of claim 36, further comprising the step of forming the inner electrode, prior to disposing it into the interior space of the housing, such that an outer extent of the inner electrode is generally conforming to a contour defined by the interior space of the cell housing.

39. A method of manufacturing an electrochemical battery cell having a battery cell housing including an interior space, a first terminal and a second terminal, the method comprising the steps of:
   forming an inner electrode outside of the battery cell housing;
   then inserting the inner electrode into the interior space of the housing such that it is in electrical communication with the second terminal of the cell housing; and,
   then inserting an outer electrode material within the interior space of the cell housing such that the inner electrode is embedded therein and is in electrical communication with the first terminal of the housing, and wherein the electrochemical battery cell has a capacity ratio ($C_R$) in a range from 0.5 to 0.68.

40. The method of claim 39, wherein the step of forming the inner electrode further comprises forming the inner electrode such that an outer extent of the inner electrode is generally conforming to a contour defined by the interior space of the cell housing.

41. The method of claim 39, further comprising the step of:
   encapsulating the inner electrode before the step of inserting the inner electrode into the interior space of the housing.

42. The method of claim 36 further comprising the step of pressing the outer electrode material disposed within the interior space of the cell housing.

* * * * *

UNITED STATES PATENT AND TRADEMARK OFFICE
CERTIFICATE OF CORRECTION

PATENT NO. : 7,264,904 B2  
APPLICATION NO. : 10/846020  
DATED : September 4, 2007  
INVENTOR(S) : Coffey et al.

It is certified that error appears in the above-identified patent and that said Letters Patent is hereby corrected as shown below:

Column 17, Line 60, "from" should read --form--

Signed and Sealed this

Fourth Day of December, 2007

JON W. DUDAS  
*Director of the United States Patent and Trademark Office*